(12) United States Patent  
Seibold et al.

(10) Patent No.: US 8,449,012 B2  
(45) Date of Patent: May 28, 2013

(54) COLLAPSIBLE SEAT

(75) Inventors: Kurt A. Seibold, Whitmore Lake, MI (US); Joseph F. Prosniewski, Brownstown Township, MI (US); John Gomez, Howell, MI (US); Richard Tann, LaSalle (CA); Brennon L. White, Novi, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/125,844

(22) PCT Filed: Oct. 30, 2009

(86) PCT No.: PCT/US2009/062765  
§ 371 (c)(1),  
(2), (4) Date: Sep. 7, 2011

(87) PCT Pub. No.: WO2010/062684  
PCT Pub. Date: Jun. 3, 2010

(65) Prior Publication Data  
US 2011/0309650 A1 Dec. 22, 2011

Related U.S. Application Data

(60) Provisional application No. 61/110,557, filed on Nov. 1, 2008.

(51) Int. Cl.  
*B60N 2/02* (2006.01)

(52) U.S. Cl.  
USPC .......................................... 296/65.05; 297/14

(58) Field of Classification Search  
USPC .................... 296/65.05; 297/14, 61.316, 320, 297/334  
See application file for complete search history.

(56) References Cited

U.S. PATENT DOCUMENTS

| 3,594,037 | A | 7/1971 | Sherman |
| 6,089,641 | A | 7/2000 | Mattarella et al. |
| 7,311,358 | B2 | 12/2007 | White et al. |
| 2005/0017561 | A1 | 1/2005 | Burmeister, III et al. |
| 2006/0267366 | A1 | 11/2006 | Seibold |

*Primary Examiner* — Lori Lyjak  
(74) *Attorney, Agent, or Firm* — Dickinson Wright PLLC

(57) ABSTRACT

A collapsible seat assembly providing a compact size in the stowed position. The seat assembly has a reduced overall height in the stowed position, and an articulated bolster and lumbar supports which provides a reduced compact size of the seat in the stowed position. A cover may extend over the seat in the stowed position.

21 Claims, 21 Drawing Sheets

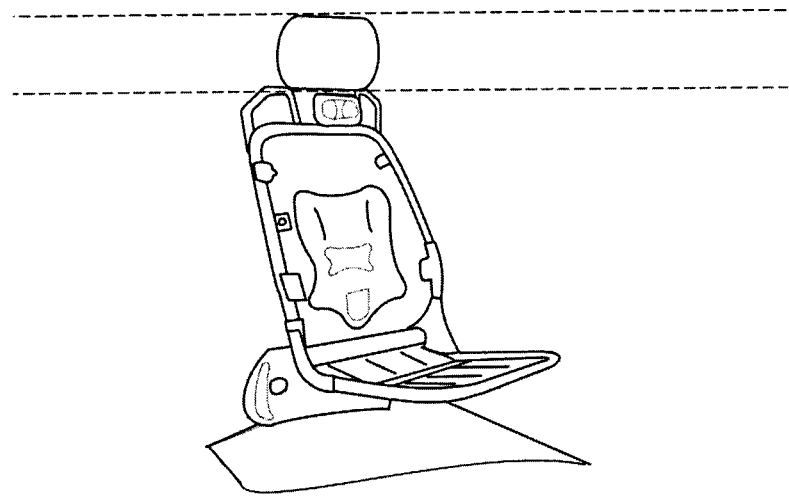
FIG.15A
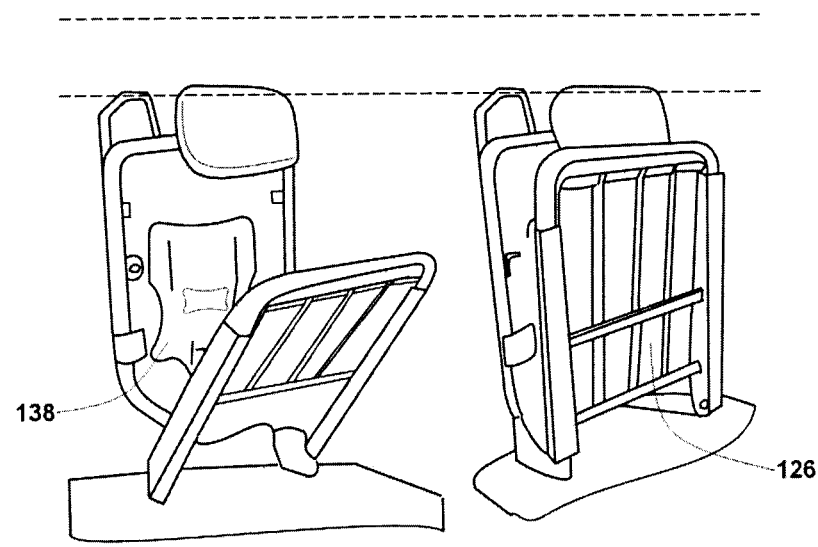
FIG.15B  FIG.15C

US 8,449,012 B2

COLLAPSIBLE SEAT

CROSS REFERENCE TO RELATED APPLICATION

This U.S. National Stage patent application claims the priority of PCT Patent Application International Serial No. PCT/US2009/062765 filed on Oct. 30, 2009, entitled "Collapsible Seat," and U.S. Provisional Application Ser. No. 61/110,557 filed on Nov. 1, 2008, entitled "Collapsible Seat," the entire disclosure of the applications being considered part of the disclosure of this application and hereby incorporated by reference.

BACKGROUND

The invention relates to a contoured collapsible seat assembly providing a compact size in the stowed position. More specifically, the present invention relates to a collapsible seat having reduced overall height and depth in the stowed position, an articulated insert and lumbar supports providing a reduced compact size of the seat in the stowed position.

To increase the versatility of vehicles, many modern vehicles include seats that fold or collapse. These seats commonly are designed to move to a stowed position to maximize cargo space of the vehicle. Generally, two types of such seats are available, those that fold and stow against the floor pan of the vehicle and those that fold and stow against the wall of a vehicle. Stowable seats that stow against the wall of the vehicle generally include additional design limitations as compared to seats that stow against the floor pan of the vehicle. For example, designers of seat assemblies may modify the floor pan of a vehicle to accommodate a comfortable seat with generous amounts of cushion and other desirable features, while using a customized well in the floor pan of the vehicle to store the seat of the vehicle. In comparison, due to the outward shape of the vehicles, designers of seats that stow against the wall of the vehicle may have limited ability to modify the interior wall of the vehicle.

Therefore, a seat that folds flat against the wall of a vehicle, particularly a stadium style folding seat for a vehicle that maximizes cargo space by minimizing stowed space while maintaining excellent comfort and safety for the user and does not block visual sight lines is desired.

SUMMARY

The invention relates to a contoured collapsible seat assembly providing a compact size in the stowed position. More specifically, the present invention relates to a collapsible seat having reduced overall height in the stowed position, an articulated insert and lumbar supports providing a reduced compact size of the seat in the stowed position.

BRIEF DESCRIPTION OF THE DRAWINGS

FIG. 15A is a front perspective view of the seat frame in FIG. 14;

FIG. 15B is a front perspective view of the seat frame in FIGS. 14 and 15A in a partially folded or intermediate position;

FIG. 15C is a front perspective view of the seat frame in FIG. 14 in a stowed position;

DESCRIPTION

Figure 1:
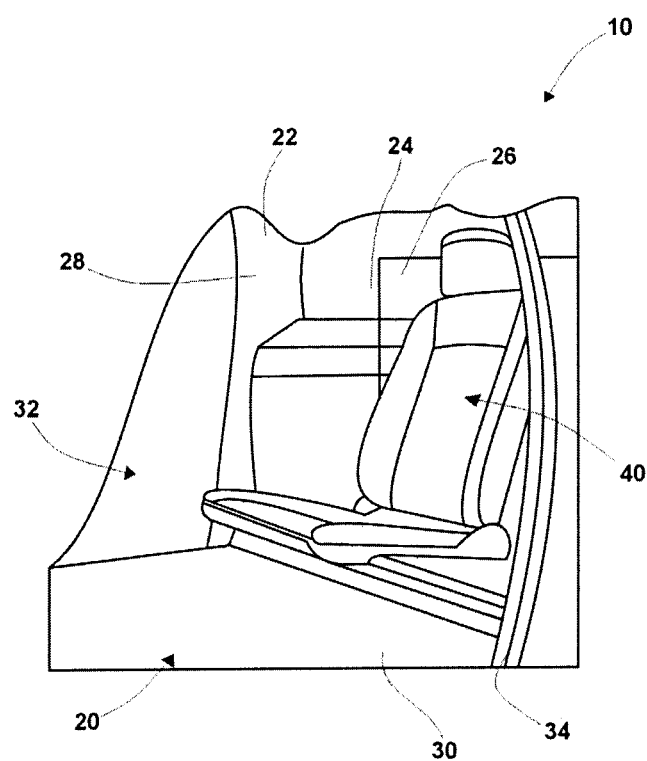
FIG. 1 illustrates a partial perspective view of a vehicle with an exemplary seat assembly with one seat portion stowed and the other seat portion in a sitting position.
Figure 2:
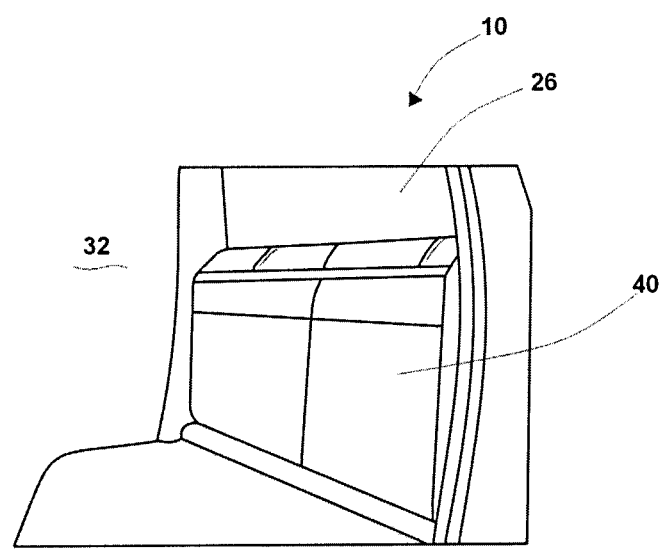
FIG. 2 illustrates the seat assembly of FIG. 1 with both seat portions being stowed.

The present invention, as illustrated in the Figures, is generally directed to a seat assembly 40 for a vehicle 10. The vehicle generally includes, as illustrated in FIGS. 1 and 2, an interior space 20 having interior walls 22 including a rear wall 24 and side walls 28, and a floor pan 30. The rear wall 24 may include a rear window 26. The vehicle 10, as illustrated in FIGS. 1 and 2, may include door openings 32 defined by door frames 34.

The seat assembly 14, as illustrated in FIG. 1, shows a collapsible seat for use in a vehicle. More specifically, the seat assembly 40 is shown in an exemplary second row of a cab of a vehicle 10, for example, an extended cab truck. The seat assembly 40 is shown in a collapsed or otherwise known as the stowed position in FIG. 2 and a portion of the seat in a useable or open position and a portion of the seat stowed in FIG. 1. The seat assembly 40 provides a very small package size when stowed along with providing known occupant comfort and safety features such as lumbar support, compliant support and a head restraint. In addition, the seat assembly 40 provides easy access under the bottom of the seat bottom 42 for storage of other objects while in the open or seating position. As illustrated in the Figures, the seat assemblies 40 are formed without vertical leg supports to allow easy access under the seat bottom 42 and open for easy access to cargo space. While reference is made to seat assemblies used in a vehicle, it should be understood that the present invention may be used in many other applications, including, among others, airline and entertainment seating applications.

Figure 3:
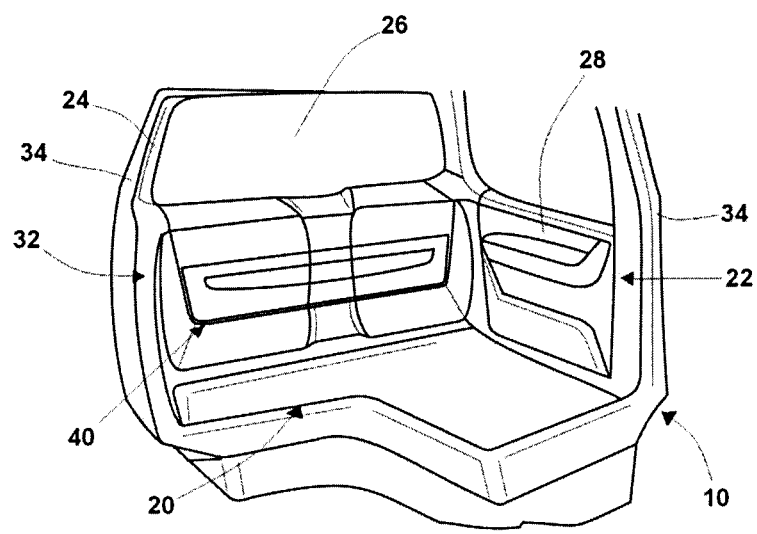
FIG. 3 illustrates a partial perspective view of a vehicle with a second exemplary seat assembly in the stowed position.

FIG. 3 is a sketch of the seat assembly 40 shown in the stowed position of the second row of a truck having a rear window 26. As shown, when the seat assembly 40 is in the stowed position, the head restraint 48 does not block the occupant's or operator's ability to see through the rear window 26. Although in some embodiments the seat assembly 40 could be build with an affixed headrest that does not tilt and fold.

Figure 4A:
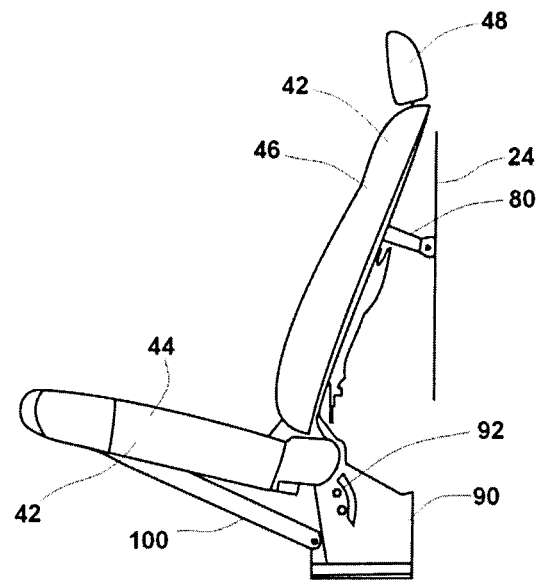
FIG. 4A illustrates a side view of an exemplary seat in the sitting position.
Figure 4C:
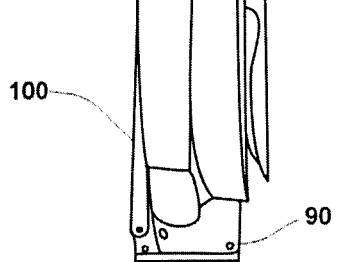
FIG. 4C illustrates a side view of the seat of FIGS. 4A and 4B in a stowed position.
Figure 4B:
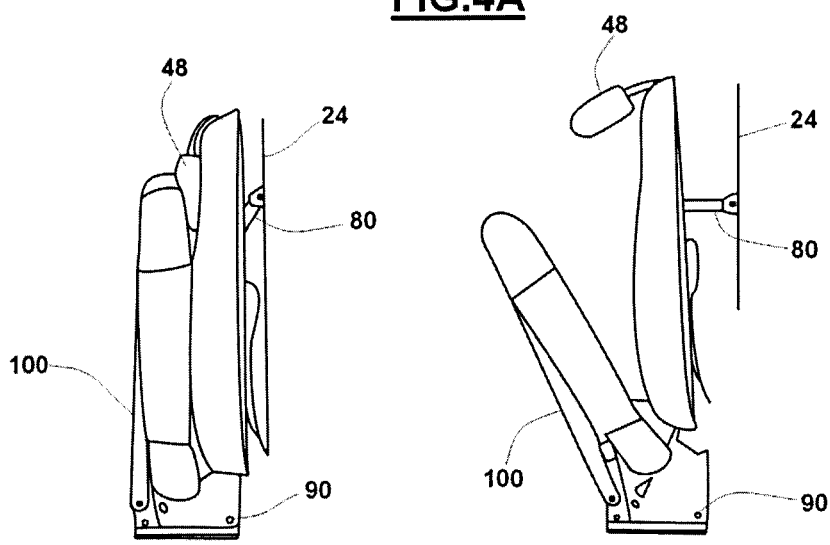
FIG. 4B illustrates a side view of the seat of FIG. 4A in a position between the seating position and the stowed position.

Referring to FIGS. 4A-4C, the seat assembly 40 includes a seat bottom 44, seat back 46 and head restraint 48. The seat assembly 40 includes a seat frame 49 having a core (not illustrated) and a trim cover 42, such as a leather or fabric material. It should be understood that the core may also be known as a foam core which may be made of any number of known materials including, but not limited to, polypropylene, polyurethane, or expanded polypropylene. FIGS. 4A-4C show the seat assembly in the open, partially stowed and stowed positions. It can be seen that the seat assembly 40 provides a very small package size and a reduced overall height, in the stowed position.

As stated above, the seat assembly 40 generally includes a seat bottom 44, a seat back 46 and a headrest 48. The seat frame 49 provides the desired structural support for the seat assembly 40 and generally includes a seat bottom frame portion 50, coupled to an upper seat frame portion 70 with a pivot base 90. A seating support 120 may provide the desired support for occupants between an outer frame extent that extends around or near the perimeter of the seating portions or areas 43 that provide primary support for the occupant.

As further illustrated in FIG. 4A, the seat assembly 40 is in the open or seating position. In the open or seating position, the seat back 46 is angled relative to and not substantially aligned with the rear wall 24. The lower portion of the seat back 46 near the pivot axis 74 is positioned at its maximum distance from the rear wall 24. The seat bottom 44 extends outwardly from the rear wall to provide a seating surface and the leg truss 100 is acutely angled relative to the seat bottom 44 and extends from the pivot base 90 away from the rear wall 24 to be coupled to the seat bottom frame 50 a distance away from the pivot base 90.

As illustrated in FIG. 4B, the seat assembly 40 is in a partially stowed position with the seat bottom 44 partially upright and the headrest 48 partially folded over. The leg truss 100 pivots to a reduced angle relative to the seat bottom 44 and increasingly becomes aligned with the seat bottom 44 as the seat assembly 40 is moved to a stowed position.

The seat assembly is illustrated in FIG. 4C in the stowed position. The headrest 48 is fully articulated and stowed, and the seat bottom 44 is substantially aligned with and against the seat back 46. Although not immediately noticeable, it is important to note that the seat back 46 reduces in height as it moves to the stowed position and moves closer to the rear wall 24 due to the configuration of the pivot base 90. The link 80 is also configured to pivot to allow the seatback 46 to reduce in height at the same time the seatback approaches the rear wall 24.

Figure 5:
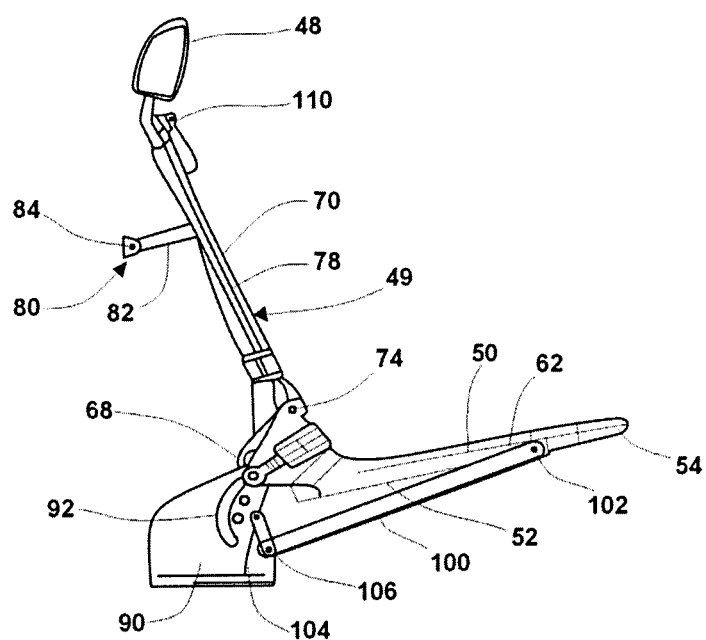
FIG. 5 is a side view of an exemplary frame.
Figure 6:
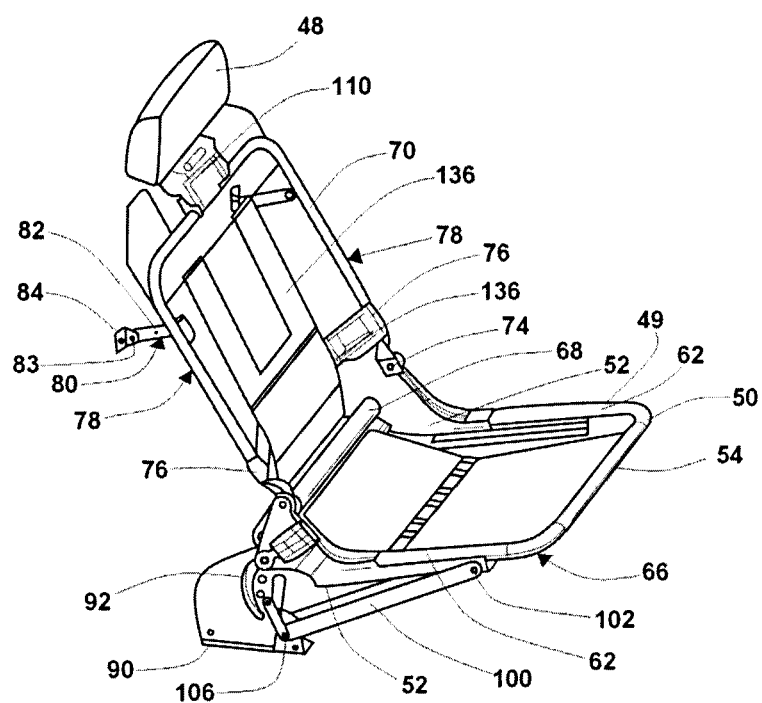
FIG. 6 is a perspective view of the seat frame in FIG. 5.

FIGS. 5 and 6 provide more detail regarding the seat frame 49 as well as the bottom frame 50, the back frame 70 and a head restraint 48. The bottom and back frames 50, 70 are shown as made of tubular steel; however, it should be appreciated that many other materials and shapes may be used to form the bottom and back frames including for example, a C-shaped steel frame. The bottom frame 50 includes an outer frame extent 66 having two lateral sides 62, a front extension 54 and a rear cross member 68. The bottom frame 50 is pivotably connected to the pivot base 90 which may be mounted to any structure, that the seat is installed for use in, typically the floor pan 30. The pivot base 90 includes an arcuate, or similar profile, slot 92 providing a predetermined amount of movement of the bottom frame 50 from the open position to the stowed position, as further described herein, though other mechanisms, such as other styles of linkages to simulate kinematics could be used. Similarly, the back frame 70 is pivotably connected by an upper anchor 80 having a link 82 extending to a wall mounting bracket 84 which is also mounted to the structure that the seat is installed for use in, typically the rear wall 24. The bottom frame 50 is also supported in the open position by the leg truss 100. The leg truss 100 is pivotably connected to the bottom frame 50 and to the pivot base 90 providing support to the bottom frame 50 when in use by an occupant.

Figure 7A:
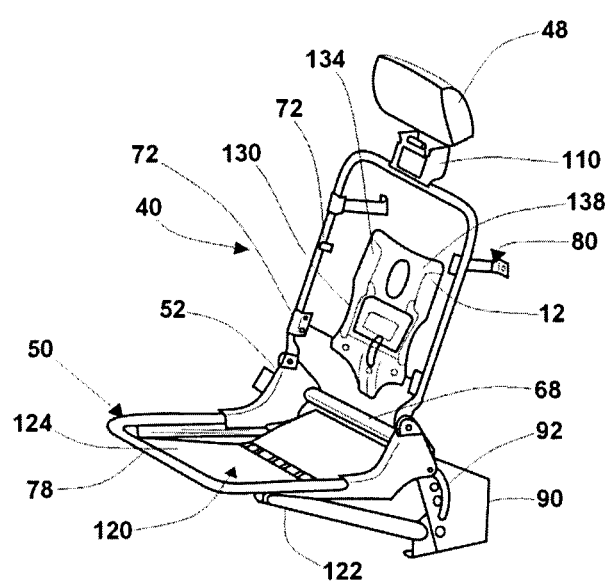
FIG. 7A is a perspective view of an exemplary seat showing bolsters in a seating position.
Figure 7B:
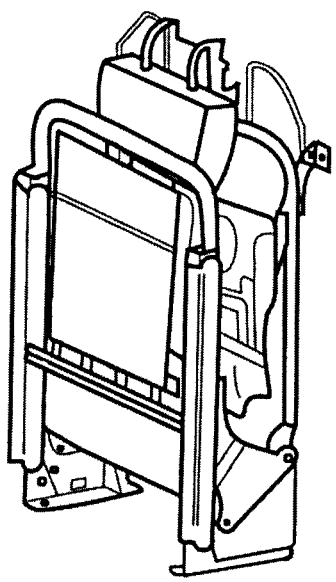
FIG. 7B is a perspective view of the seat in FIG. 7A in a stowed position.
Figure 7C:
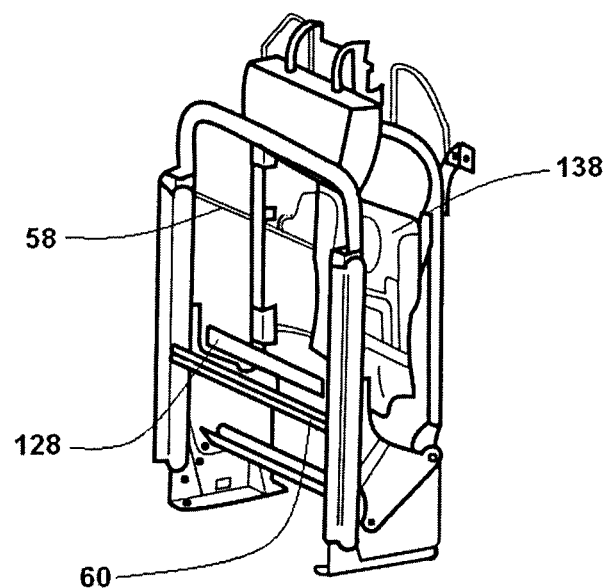
FIG. 7C is a perspective view of the seat in FIG. 7B without the lower seat bolster.

FIGS. 7A-7C show a perspective view of the seat assembly 40 in the open position and the stowed position. The seat assembly 40 includes the seat frame 49 having both the bottom and back frames 50 and 70 formed to provide a support perimeter for the occupant. In other words, since the bottom frame 50 is formed closer to the outside perimeter of the seat bottom 44, an occupant seated on the seat bottom will be more likely to sink or conform into the inner portions supported by the lower support 122 instead of sitting on top of the frame. Similarly, since the back frame 70 is formed closer to the outside perimeter of the seat back, a seated occupant is more likely to sink into the seat back thereby providing more comfort and safety. The seat assembly is also shown in FIGS. 7A-7C and includes lumbar and compliant supports more fully described herein.

As further illustrated in FIG. 7A, the seat being in the seating position, the lower support 122 of the support structure 120 is configured to be in a V-shape or a concave shape, set within the lower seat frame 50. This V-shape specifically is configured to allow an occupant to seat between the sides 62 and slightly recessed to the sides 62. More specifically, the lower support 122 extends from front extent 54 toward the rear cross member 68. About mid-point or slightly rearward of mid-point along the sides 62 of the lower seat frame 50, the lower support 122 is pulled into its V-shape by a lower tension member 128. The lower tension member 128 is best illustrated in FIG. 7C spaced above a cross member 60 that extends between the two leg trusses 100. The lower support 122, in particular the compliant support 124 of the lower support 122 and the embodiments including a further compliant support 124 work with the lower tension member 128 to create a V-shape in the seating position and a flatter profile of the compliant support 124 in that the stowed position as illustrated in FIG. 7B. As best seen in FIG. 7C, the lower tension member 128 is positioned directly above the leg cross member 60. This position is illustrated in FIG. 7C and allows the compliant support 124 to be relaxed from tension when the leg trusses 100 are folded against the lower seat frame 50 and in particular the sides 62 and create the V-shape tension illustrated in FIG. 7A when the seat is positioned in the seating position with the leg trusses spaced a greater distance from the lower seat frame 50 at the point where the leg cross member 60 extends.

Figures 8A, 8B, 8C:
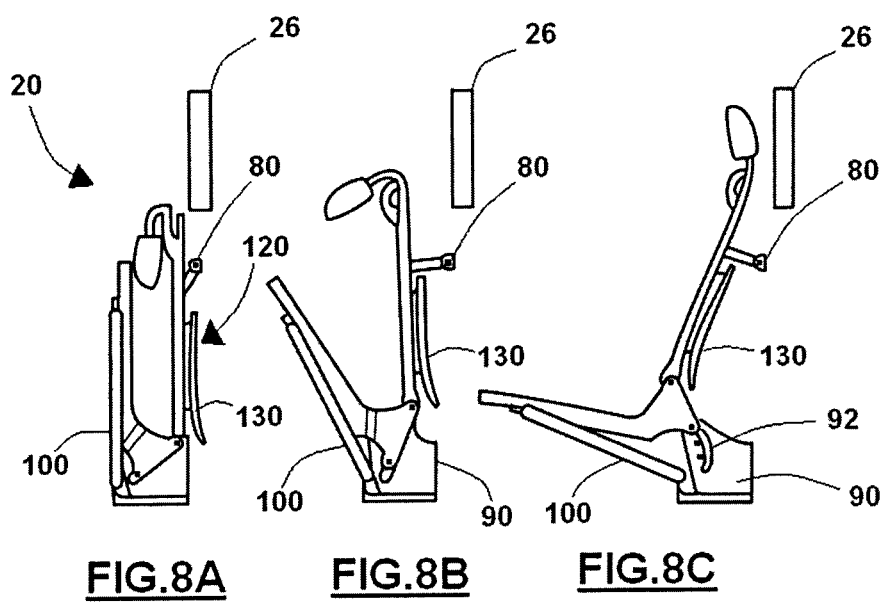
FIG. 8A is a side view of an exemplary seat frame in a stowed position.
FIG. 8B is a side view of the seat in FIG. 8A in an intermediate position.
FIG. 8C is a side view of the seat in a seating position.

FIGS. 8A-8C further show the position of the leg trusses 100 relative to the lower seat frame 50 such that in FIG. 8A, the leg trusses are substantially engaged against the lower seat frame 50 and in FIG. 8B, the seat is moved from the stowed position to the seating position where the leg trusses increasingly angle away from the lower seat frame 50 to increase the distance with the distance being maximized in FIG. 8C. As the lower tension member 128 is coupled to the leg cross member 60, as the legs extend away from the lower seat frame 50, the lower tension member is pulled downward in the direction of the leg trusses 100 creating the V-shape tension to the lower support 122.

FIGS. 7A and 8A-8C further illustrate an upper support plate 138. The upper support plate 138 forms part of the seating support 120 and in particularly upper support 130 as illustrated in greater detail below.

FIGS. 8A-8C show the seat assembly 40 in the open, partially stowed and stowed positions; however, the seat 40 is shown without the seat core and trim cover. The movement of the seat assembly 40 downward when in the stowed position is shown with a side view of the seat positioned with respect to a rear window 26, with a reference height line drawn between the Figures. In the open position the seat assembly 40 is shown with the head restraint 48 in a proper position for providing occupant support and comfort, and with the seat bottom 44 fully pivoted outward and upward in the arcuate slot 92 of the pivot base 90. However, in the stowed position in FIG. 8C, the seat assembly 40 is shown fully collapsed after having moved significantly downward by articulating in the arcuate slot 92 of the pivot base 90. Most importantly, it should be appreciated that the overall height of the seat assembly is lowered from the open position to the stowed position, with particular emphasis on the height of the seat back 46, not including the headrest 48, as may be seen in FIGS. 8A-8C. To provide this reduction in height when in the stowed position, the bottom frame 50 articulates in the pivot base 90 moving downward in the arcuate slot 92 during collapsing of the seat bottom 44 toward the stowed position. Similarly, as shown, the head restraint 48 may also be articulated to fold downward during collapsing of the seat back 46 toward the stowed position. The upper frame 70 being coupled to the lower frame 50 near the pivot base is also moved back and downward.

FIGS. 7C and 8C show the seat assembly in the fully collapsed, or stowed, position. As described further herein, in this position, the seat bottom frame 50 is articulated in the arcuate slot 92 of the pivot base 90 downward, the leg truss 100 pivots upward about a base pivot 106 in the pivot base, and the back frame 70 with the upper anchor 80, specifically the link 82, rotates about a pivot 83 in the wall bracket, to collectively provide a very small overall package size of the collapsible seat in the stowed position.

Figure 9A:
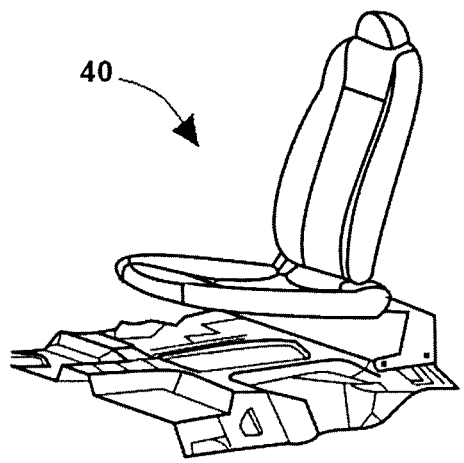
FIG. 9A is a perspective view of the seat in a seating position in relation to the floor pan and the rear support bracket.
Figure 9B:
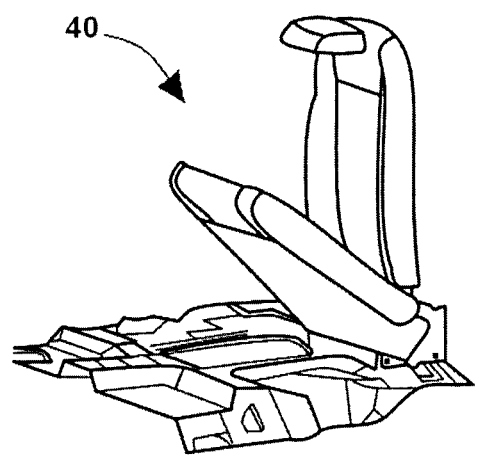
FIG. 9B is a perspective view of the seat in FIG. 9A in a partially folded position, and showing the headrest partially folded.
Figure 9C:
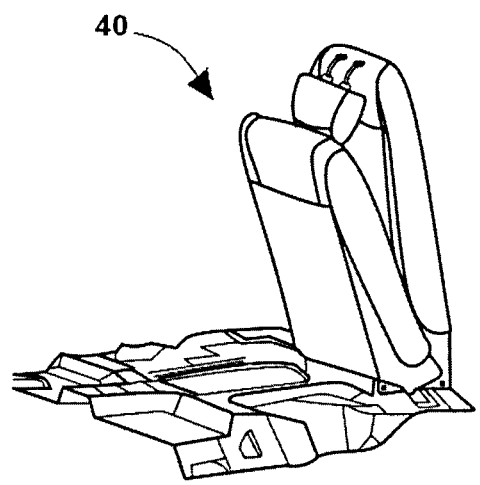
FIG. 9C is a perspective view of the seat in FIGS. 9A and 8B in an almost folded position.
Figure 9D:
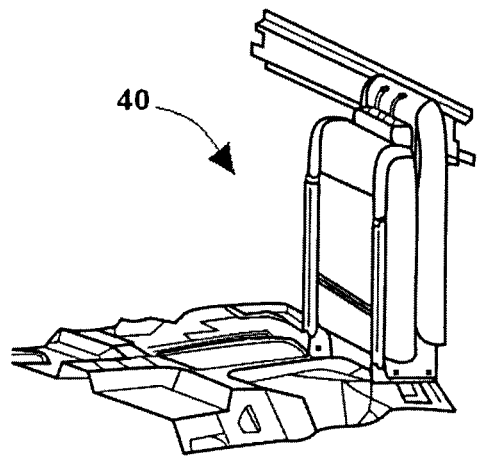
FIG. 9D is a perspective view of the seat in FIGS. 9A-9C in a completely folded position.
Figure 10:
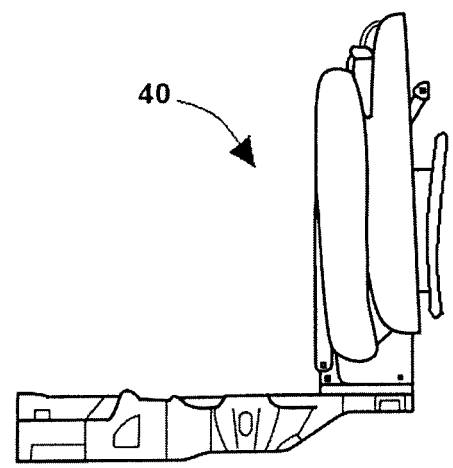
FIG. 10 is a side view of the seat in FIG. 9D.
Figure 11:
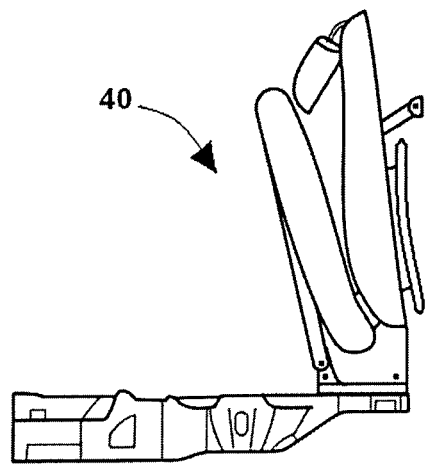
FIG. 11 is a side view of the seat in FIG. 9C.
Figure 12:
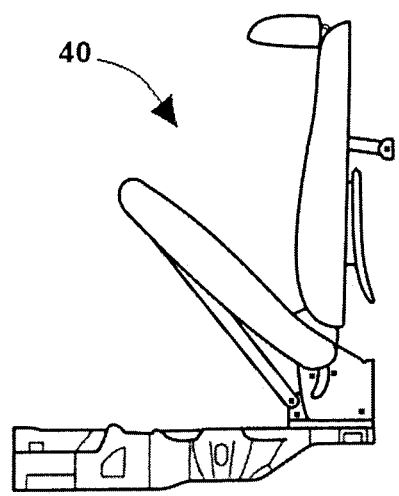
FIG. 12 is a side view of the seat in FIG. 9B.
Figure 13:
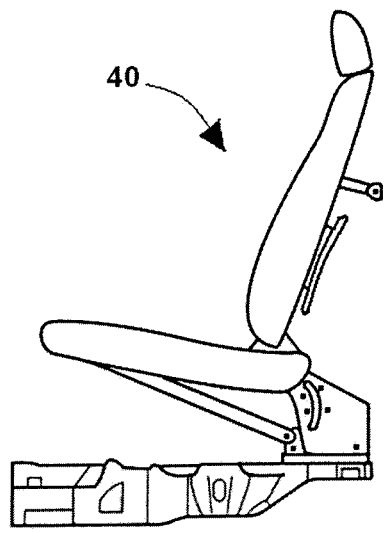
FIG. 13 is a side view of the seat in FIG. 9A.
Figure 14:
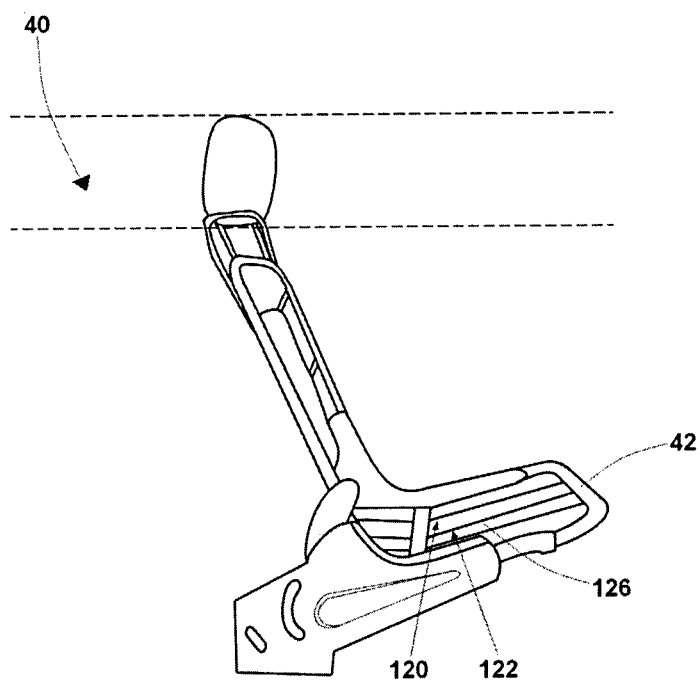
FIG. 14 is a side view of a seat frame showing the seat bolster and lumbar support in a seating position.
Figure 16:
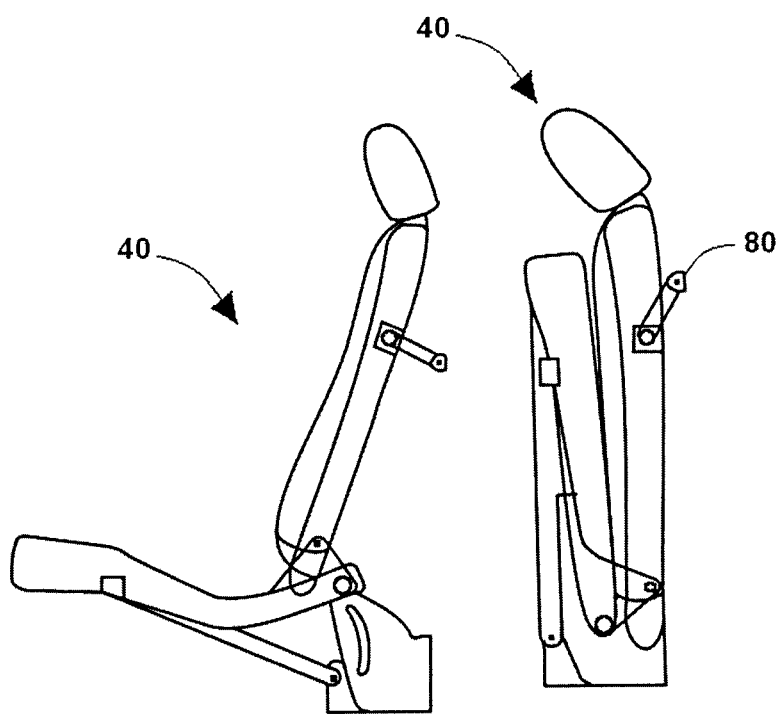
FIG. 16 is a side view line drawing of a seat in a seating position and in a stowed position, particularly illustrating the locations of pivot points.
Figure 17:
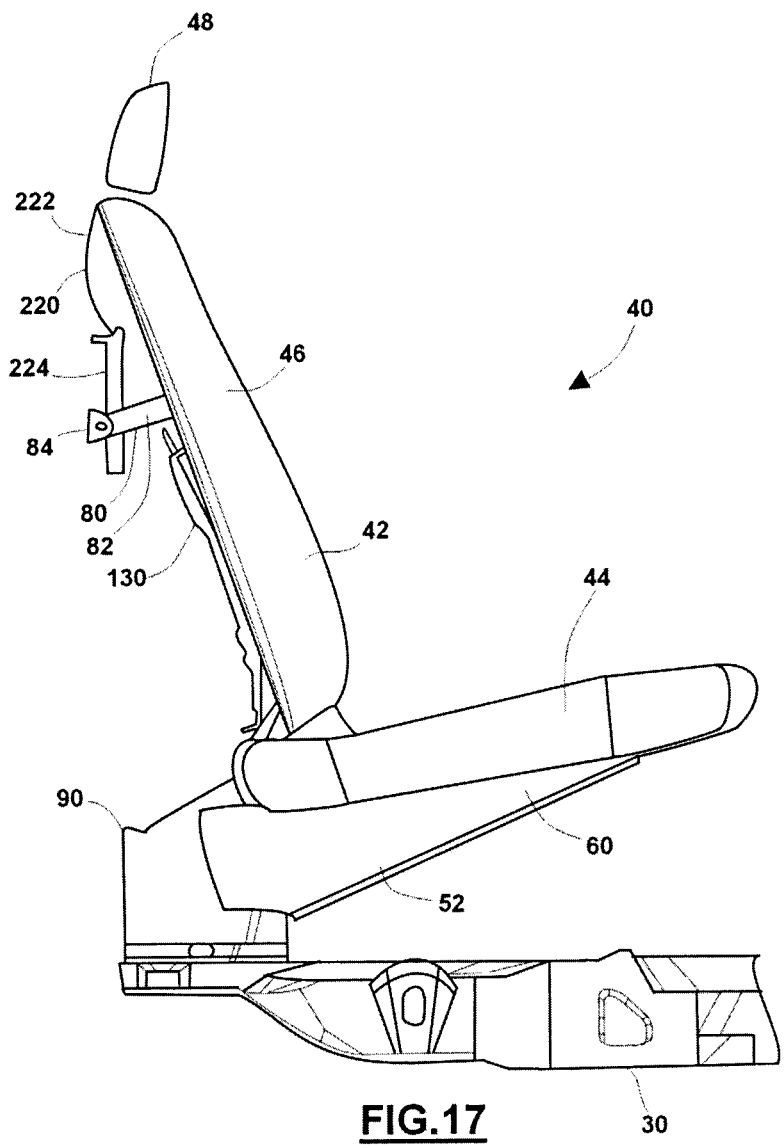
FIG. 17 is a side view of a seat in the seating position with an optional cover.
Figure 18:
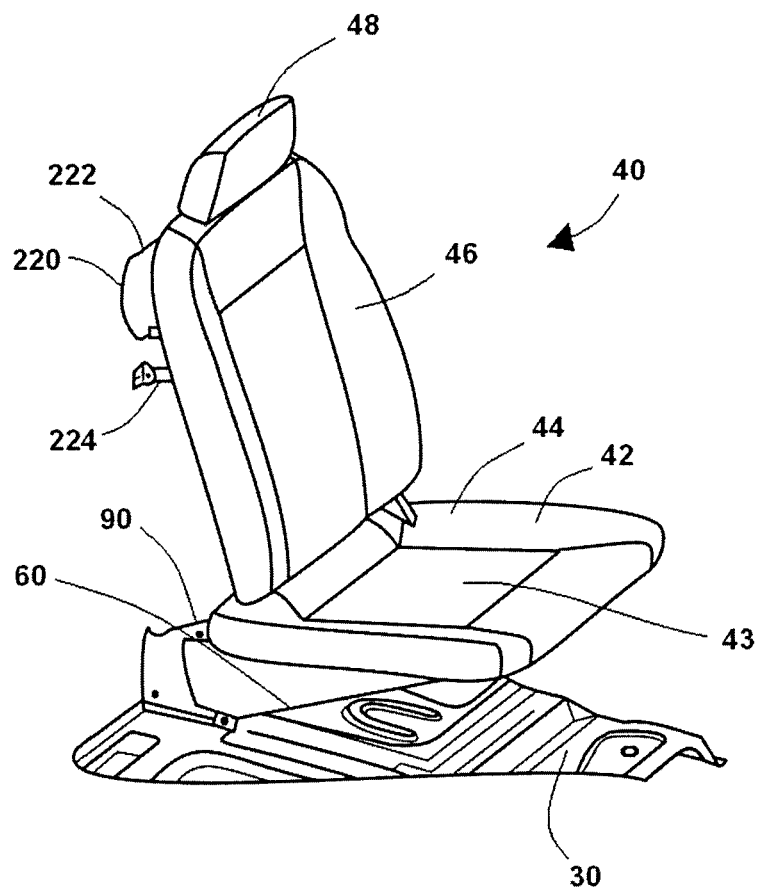
FIG. 18 is a front perspective view of a seat in the seating position with the optional cover.

Referring to FIGS. 9A-9D, the collapsible seat, having the frame, core and trim cover, is mounted to a structure in at least two general locations including the floor pan 30 and a vertical wall such as the rearward wall 24 of a truck cab (not shown). FIGS. 9A-9C show the seat assembly 40 in four positions including: the stowed position (FIG. 9D), partially unfolded and moving downward (FIG. 9C) toward an open position (hereinafter referred to as the "opening position"), the open position (FIG. 9A), and a partially folded and moving upward (FIG. 9B) toward the stowed position. FIGS. 10-14 further include side views of different images of the seat assembly. More specifically, FIG. 10 shows the seat assembly 40 in the stowed position. FIG. 11 illustrates the seat assembly 40 in the opening position. FIG. 12 illustrates the seat assembly 40 in the closing position. FIG. 13 illustrates the seat assembly 40 in the open position.

FIGS. 14 and 15A-15C show the dramatic downward movement of the seat assembly, having only the head restraint 48 with the core and trim cover thereon, from the open to the stowed position. In addition, these Figures show the collapsible seat including articulating center seating supports positioned in the bottom frame and the back frame. More specifically, FIGS. 14 and 15A-15C show the back frame having an articulating lumbar center seating support 138 movably connected thereto providing lumbar support to the occupant when in the open position and collapsed when in the stowed position. Similarly, FIGS. 14 and 15A-15C show the bottom frame having an articulating center seating support 122 movably connected thereto providing compliant support 124 to the occupant when in the open position and collapsed in the stowed position. In addition, as discussed above, the design and location of the bottom and back frames 50 and 70 provide lateral compliant support to an occupant since both are formed closer to the perimeter of the seat bottom 44 and seat back 46.

FIGS. 7A, 8A-8C, 15A-15C and 17 depict the lumbar support 138 of the collapsible seat in more detail. The lumbar support 138 is fixedly mounted to back frame 70 and includes a support surface extending in a direction away from the occupant to provide compliant support to the occupant. At least a portion of the support surface may be retracted, or deflected, inward toward the occupant side of the seat back 46 when the seat assembly 40 is moved to the stowed position. In this embodiment, the lumbar support 138 includes at least one extension spring 134 which preloads the bolster away from occupant side of the seat back in the open position. The tension springs or biasing members 134 may be coupled to anchors 72 on the frame 49, particularly the upper frame 70. In this embodiment, the spring 134 is shown as a cantilever spring formed of either round wire spring steel or flat spring steel. It should be appreciated that the opening may also be made of a composite material. However, when the seat assembly 40 moves in the closing position toward and adjacent to the rearward wall of the vehicle, such as the back wall of the cab of a truck, the lumbar support hits at least a portion of such wall thereby overcoming the spiral permitting the seat back to collapse. It should be appreciated that other preloading devices may be used with the support surface including, for example, compression springs or the extension spring shown in FIGS. 15A-15C. A tension strap 136 may also pull the upper lumbar support 138 toward the occupant. The lumbar support 138 may be formed without the tension straps 136, such that displacement toward the front of the seat back occurs upon contact with the rear wall.

FIGS. 14 and 15A-15C show the compliant support 124 of the collapsible seat in more detail. The compliant support 124 includes a mat made of stretchable material extending between the front extension of the bottom frame 54 and the rear cross member 68 of the bottom frame 50. In addition, the mat is also attached to at least a portion of the leg truss 100, such as the illustrated leg cross member 60 such that in the open position such attachment to the leg truss pulls the mat downward, specifically the lower tension member 128 toward the floor of the structure thereby providing compliant support in the open position. However, since the leg truss 100 is closer to the frame in the stowed position, the mat 122 is not stretched downward but instead relaxes to a predetermined installed tension to thereby reduce the amount that the collapsible seat extends out from the rear wall of the vehicle. In this embodiment, the mat 122 is shown attached to the leg truss by providing a support member extending laterally from and between each leg truss 100. It should be appreciated that the mat may be attached to the leg truss 100 in other ways so long as the mat 122 follows the motion of the leg truss 100 when the seat assembly 40 is moved from the open to stowed positions.

Figure 19:
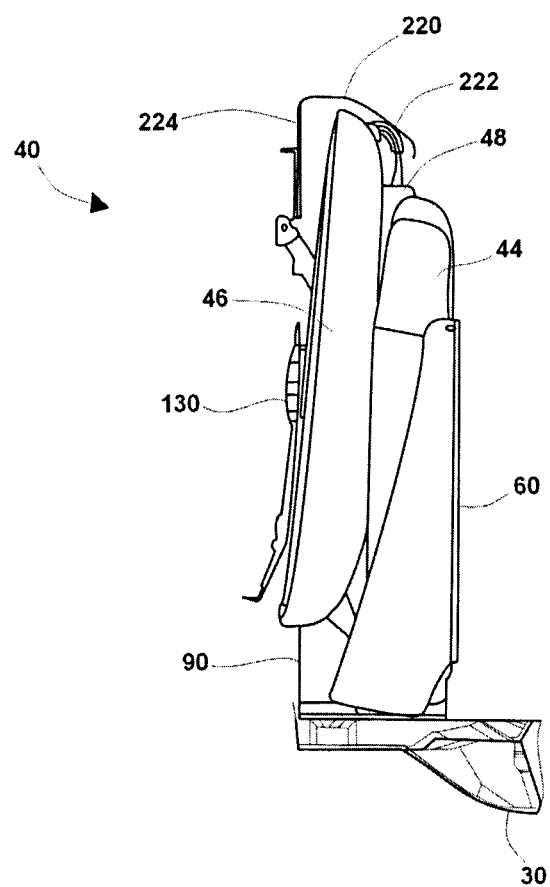
FIG. 19 is a side view of the seat in FIG. 17 in the stowed position with the optional cover deployed over the top of the stowed seat.
Figure 20:
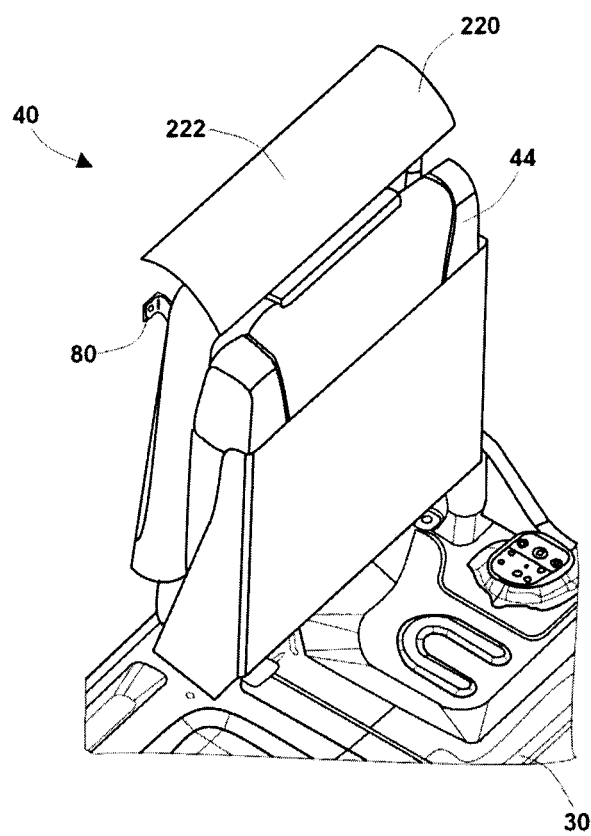
FIG. 20 is a side view of the seat in FIG. 18 in the stowed position with the optional cover deployed over.

As illustrated in FIGS. 17-20 the seat may include an optional cover 220. The cover 220 may be affixed to the rear wall 24 of the vehicle or to the link assembly 80. As the optional cover 220 may include a shield 222 and a bracket assembly 224. The cover 220 may be configured to automatically spring forward over the top of the seat assembly 40, when the seat is placed into the stowed position, as illustrated in FIGS. 19-20. The cover 220 is to improve the visual aspect of the stowed seat, as well as protect the stowed seat from dust and debris.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A seat assembly comprising:
a frame assembly having a lower frame having sides and a front extent extending between the sides, an upper frame, a first leg truss, a second leg truss, a first pivot base and a second pivot base and wherein said upper and lower frames are pivotably interconnected and wherein at least one of said lower frame and an upper frame is movably coupled to said first and second pivot bases and wherein said first and second leg trusses are each pivotably coupled to one of said first and second pivot bases and each are pivotably coupled to one of the sides of the lower frame, and wherein said frame assembly is configured to be moveable between a seating position and a stowed position and wherein in said stowed position said upper frame and said lower frame are substantially vertical, and further including an anchor coupled to said upper frame and configured to mount to a wall of a vehicle.

2. The seat assembly of claim 1 wherein at least one of said first and second pivot bases include an arcuate slot and said lower frame engages said arcuate slot and is configured to move within said arcuate slot.

3. The seat assembly of claim 1 one of said first and second leg trusses extends between said first pivot base and one of said sides, and the other of said first and second leg trusses extends between said second pivot base and the other of said sides.

4. The seat assembly of claim 2 wherein said arcuate slot is opposite the arc said front extent travels as the seat assembly is moved between a seating position and a stowed position, wherein in said seating position, the lower frame extends outwardly from the upper frame and in said stowed position the lower frame is substantially aligned with said upper frame.

5. The seat assembly of claim 1 further including a leg cross member extending between said first leg truss and said second leg truss, and wherein said leg cross member spaced from said lower frame in said seating position and a seating support that is coupled from the front of the lower frame to the rear of the lower frame and wherein said seating support includes a lower tension member coupled to said leg cross member.

6. The seat assembly of claim 5 wherein said seating support is configured to move with said leg cross member and relative to said sides.

7. The seat assembly of claim 1 further including an upper seat back frame, and an upper support having an upper support plate under tension biased away from the front of said seat back frame.

8. The seat assembly of claim 7 wherein said upper support is configured to be forced toward said upper seat frame as said seat back moves from a seating position to a stowed position.

9. The seat assembly of claim 1 wherein said upper frame is reduced in vertical height as said seat moves from a seating position to a stowed position.

10. The seat assembly of claim 1 further including a cover that extends outwardly over the upper frame in the stowed position and approximately along the upper frame in the seating position.

11. A seat assembly comprising:
a seat frame having an upper frame with an outer upper frame extent and a lower frame with an outer lower frame extent having sides and a front extent and a seating surface extending over the frames and wherein said seating surface includes a central seating area and side bolsters and wherein said upper and lower outer frame extents pass through said bolsters and wherein said central seating area is recessed relative to said bolsters and wherein said lower frame includes a compliant support coupled to a front extent of the lower frame and extending toward a rear cross member and wherein said compliant support is coupled to a lower tension member that is pulled away from said lower frame as said seat moves from a stowed position to a seating position.

12. The seat assembly of claim 11 further including pivot base having an arcuate slot and wherein said lower frame is coupled to said pivot base within said slot and wherein said compliant support is configured to move with said leg cross member and relative to said sides.

13. The seating assembly of claim 12 further including a pair of leg trusses extending from the pivot base to each side of the outer lower frame extent and wherein a leg cross member extends between said pair of leg trusses.

14. The seating assembly of claim 11 wherein the bottom of said concave shape extends below said lower outer frame extent in said seating position.

15. A seat assembly comprising:
a seat back coupled to a lower seat and wherein each are configured to move between a seating position and an approximately vertical stowed position and wherein each of said seat back and said lower seat have a first thickness in said seating position and a second thickness in said stowed position and wherein said first thickness is greater than said second thickness and wherein said seat back is reduced from said first thickness to said second thickness in part with a force applied which moves the a lumbar support of the center portion of the back in the direction forward from the rear of the seat back to the front of the seat back and wherein said lumbar support is in tension to support an occupant in the seating position.

16. The seat assembly of claim 15 wherein said upper seat back includes an upper support plate and tension springs and wherein said tension springs applies a force to the upper support opposing the seating surface.

17. The seat assembly of claim 15 wherein said upper support plate is a composite that integrates springs that push support structure rearward.

18. The seat assembly of claim 17 wherein said leg truss applies a force to said lower seat support and wherein said force is applied in the direction of said leg truss when said lower seat is in said seating position.

19. The seat assembly of claim 15 further including a cover extending over the seat in a stowed position and recessed along the back side of the seat back in said seating position.

20. A seat assembly comprising:
   a seat back coupled to a lower seat and wherein each are configured to move between a seating position and a vertical stowed position and wherein a trim panel cover is linearly driven to cover said seat in the stowed position as the trim panel cover articulates and wherein the linear driven portion of the trim panel cover is retracted via cable, and said cable receiving a force as said seat back and said lower seat are moved from the vertically stowed position to a seating position.

21. The seat assembly of claim 20 further including a bias member coupled to said linear driven portion and said trim cover panel and wherein said biasing member articulates said trim panel cover via contact with said seat back.

\* \* \* \* \*